US010984485B2

(12) United States Patent
Suzanne et al.

(10) Patent No.: US 10,984,485 B2
(45) Date of Patent: Apr. 20, 2021

(54) METHOD AND SYSTEM FOR MANAGING CONNECTED ENTITIES (71) Applicant: ORANGE, Paris (FR)

(72) Inventors: Benoît Suzanne, Nanterre (FR); Jérôme Galloyer, L'ile Saint Denis (FR)

(73) Assignee: Orange, Paris (FR)

(*) Notice: Subject to any disclaimer, the term of this patent is extended or adjusted under 35 U.S.C. 154(b) by 432 days.

(21) Appl. No.: 15/522,263

(22) PCT Filed: Oct. 16, 2015

(86) PCT No.: PCT/FR2015/052783
§ 371 (c)(1),
(2) Date: Apr. 26, 2017

(87) PCT Pub. No.: WO2016/066920
PCT Pub. Date: May 6, 2016

(65) Prior Publication Data
US 2017/0323399 A1 Nov. 9, 2017

(30) Foreign Application Priority Data

Oct. 27, 2014 (FR) ...................................... 1460328

(51) Int. Cl.
G06Q 10/00 (2012.01)
G06Q 50/00 (2012.01)
H04L 12/28 (2006.01)

(52) U.S. Cl.
CPC ......... G06Q 50/01 (2013.01); H04L 12/2825 (2013.01)

(58) Field of Classification Search
CPC .............................. G06Q 50/01; H04L 12/282
See application file for complete search history.

(56) References Cited

U.S. PATENT DOCUMENTS 8,413,204 B2 * 4/2013 White ................ H04L 12/2832
725/133
2014/0211099 A1 * 7/2014 Saha .................. H04L 12/2818
348/734

(Continued)

FOREIGN PATENT DOCUMENTS

WO WO 2014/112362 A1 7/2014
WO WO 2014/129966 A1 8/2014

OTHER PUBLICATIONS

D. A. Gupta, C. Y. N. Dwith and B. A. V. Ramakanth, "Wireless Home Automation using social networking websites," 20th Annual International Conference on Advanced Computing and Communications (ADCOM), Bangalore, 2014, pp. 12-15, doi: 10.1109/ADCOM.2014.7103241.*

(Continued)

Primary Examiner — Gabrielle A McCormick
(74) Attorney, Agent, or Firm — Knobbe, Martens, Olson and Bear, LLP (57) ABSTRACT The invention relates to a method for managing a plurality of entities, each entity being of at least one type selected from a first type and a second type, an entity of the second type being associated with a set of rules comprising event data in association with respective actions, an entity of the first type being able to publish at least one event datum on a web feed of a user, the method comprising the following steps: publication of an event datum on the web feed by a first entity of the first type; detection of a match between a rule associated with a second entity of the second type, and the published event datum; and implementation, by the second entity of the second type, of the action comprised in the rule matched with the published event datum.

11 Claims, 4 Drawing Sheets (56) References Cited

U.S. PATENT DOCUMENTS

| | | | | |
|---|---|---|---|---|
| 2014/0258363 | A1* | 9/2014 | Peco | H04W 4/70 |
| | | | | 709/202 |
| 2015/0074554 | A1* | 3/2015 | Sasaki | G06F 3/0481 |
| | | | | 715/753 |
| 2016/0378756 | A1* | 12/2016 | Kemp | G06F 16/24565 |
| | | | | 707/722 |

OTHER PUBLICATIONS

A. Z. Alkar, H. S. Gecim and M. Guney, "Web Based ZigBee Enabled Home Automation System," 2010 13th International Conference on Network-Based Information Systems, Takayama, 2010, pp. 290-296, doi: 10.1109/NBiS.2010.94.*

B. Mardiana, H. Hazura, S. Fauziyah and A. R. Hanim, "Designing a Low Cost Electronic Devices Switching System Controlled by Short Message Service," 2009 International Conference on Computer Technology and Development, Kota Kinabalu, 2009, pp. 292-295, doi: 10.1109/ICCTD.2009.166.*

O. Boyaci, V. Beltran and H. Schulzrinne, "Bridging Communications and the Physical World," in IEEE Internet Computing, vol. 16, No. 2, pp. 35-43, Mar.-Apr. 2012, doi: 10.1109/MIC.2012.18.*

Kamilaris, A. et al., "Social networking of the smart home," Personal Indoor and Mobile Radio Communications (PIMRC), 2010 IEEE 21$^{st}$ International Symposium on, IEEE, Sep. 26, 2010, pp. 2632-2637.

* cited by examiner

METHOD AND SYSTEM FOR MANAGING CONNECTED ENTITIES

This application is the U.S. National Phase application of International Application No. PCT/FR2015/052783, entitled "METHOD AND SYSTEM FOR MANAGING CONNECTED ENTITIES," filed Oct. 16, 2015, which designated the United States, and which claims the benefit of French Application No. 1460328, filed Oct. 27, 2014, the entire contents of each of which are hereby incorporated by reference herein in their entirety and for all purposes.

The present invention relates to the field of managing a plurality of communicating entities, and in particular of managing connected objects.

The invention advantageously applies to a network of connected objects, such as a private network of a user.

"Connected object" is understood to mean any object able to implement given actions and further having a communication interface for sharing information over a network. No restrictions are placed on the communication interface concerned. In the following, the example of objects connected to a wireless network through a Wi-Fi interface is considered for purely illustrative purposes.

Neither are any restrictions placed on the actions implemented by the connected objects: a motion sensor detects motion, a temperature sensor measures the temperature of a room in which it is located, a heater heats a room in which it is found, a coffee machine prepares coffee, etc. In addition, information may be sent to a local area network to which the connected objects have access, enabling the user to view it.

At present, the connected devices operate independently of each other so that information acquired by one connected object is not usable by other connected objects accessing the same network.

There is no known solution for automating actions implemented by objects connected to a network of a user.

The present invention improves the situation.

To this end, a first aspect of the invention relates to a method for managing a plurality of entities, each entity being of at least one type among a first type and a second type, an entity of the second type being associated with a set of rules comprising event data in association with respective actions, an entity of the first type being able to post (publish) one or several event data on a newsfeed of a user, the method comprising the following steps:

publishing of an event data on the newsfeed by a first entity of the first type;
detection of a correspondence between a rule associated with a second entity of the second type, and the published event data;
implementation, by the second entity of the second type, of the action comprised in the rule corresponding to the published event datum.

A "newsfeed" is understood to mean a succession of published events, possibly time stamped. A newsfeed may, for example, be associated with a user account on a social network, and the newsfeed can then be accessed by the user via a user interface of a device such as a computer, touchscreen tablet, or smartphone. The events in this case may be messages, photos, or any other digital content "Rule" is understood to mean any expression in the form "if Condition (event_data)=OK then Action." The condition may, for example, be compared with a given threshold, in particular when the event data is a numerical value (measurement, estimation, mean, etc.). As detailed above, no restrictions are placed on the action implemented by the second entity: it could be the triggering of actions such as heating a room, turning on a device, or more generally any action implemented by an actuator, but could also be the taking of measurements when the second entity is a sensor.

Entities may be connected objects. Each publication of a connected object may involve other connected objects which are detected using predefined rules, without requiring user intervention. The newsfeed serves a dual function:

it allows linking entities of a user in order to share information (event data) and to undertake corrective actions in an automated manner;
and allows the user to track actions undertaken by entities.

The action of publishing data on a newsfeed thus serves an action triggering role and an informative role for the user.

According to one embodiment, the method may comprise a preliminary step of registering, with a management unit, the first and second entities as entities of the user.

Such registration may consist, for example, of creating a social network account for each of the first and second entities, and associating these accounts with the account of the user, to allow publishing on and viewing the user newsfeed.

According to one embodiment, the method may further comprise, after registering with the management unit an entity of the second type as an entity of the user, the storing in a database of a set of rules in association with the registered entity of the second type. The management unit may be capable of implementing the detection of the correspondence between the rule associated with the second entity of the second type and the published event data by accessing the database, and sending a command to the second entity of the second type, the command identifying the action to be implemented (action contained in the rule corresponding to the published event data).

This embodiment (hereinafter referred to as the first embodiment) thus centralizes the intelligence necessary for interpreting published event data, to allow automating the implementation of corrective actions. In addition, the user has centralized access to the various sets of rules associated with the entities of the second type, thus facilitating rule modifications. Indeed, the sets of rules stored in the database may be modifiable by a user via a user interface. The user may, for example, have a device such as a computer, smartphone, or touchscreen tablet, on which an application dedicated to the social network hosting the newsfeed can be installed.

Additionally, the method may further comprise, after registering an entity of the second type with the management unit, the sending of a set of rules of the entity of the second type to the management unit in order to store the set of rules in the database in association with the registered entity of the second type.

The rules may thus be defined by default by the entity of the second type, eliminating the construction of rules at the management unit which potentially could then have to manage a large number of entities. Such default rules can then be modified by the user accessing, the management unit via a user interface.

Alternatively, each entity of the second type may store a set of rules locally, and upon the publishing of an event data, each entity of the second type can compare the published event data with the locally stored set of rules in order to detect a correspondence between a rule and the published event data.

This embodiment (hereinafter referred to as the second embodiment) allows distributing the intelligence among the various entities of the second type, thereby enabling autonomous operation of the entities. Each entity thus monitors the newsfeed to determine if actions are to be taken in response to a published event data. No prior step of declaring rules to the management unit is required, and exchanges between entities and the network are reduced.

According to one embodiment, the method may further comprise the publishing, by the second entity, of a message on the newsfeed, the message indicating the action taken by the second entity.

This allows the user to track the actions taken. The message may also be time stamped.

Additionally, the method may further comprise, upon receiving a user input to be associated with the message published by the second entity, a step of updating the rule corresponding to the published event datum, based on the user input.

Such an embodiment allows implementing a learning process for the entities of the second type, in which future actions are determined by the user feedback on actions previously taken. Such feedback may be a comment from the user or a click by the user on a graphical element such as an icon displayed next to the published message.

According to one embodiment, at least one entity of the first type may be a sensor able to publish measurement data as event data.

In one embodiment, at least one rule may further comprise an identifier of an entity of the first type, and the second entity of the second type can implement the action contained in the rule corresponding to the published event data only if the identifier of the entity of the first type comprised in the rule corresponds to the first entity that published the event data.

Such an embodiment is advantageous in that it ensures the action taken is relevant. If the event data is a temperature measured in a first room, it may be desirable for the user to turn on only the heater located in that first room. Similarly, if the event data is the detection of a presence in a hallway, there is no need to turn on all the lights in the user's residence, as the user may only wish to turn on the light in the hallway.

A second aspect of the invention relates to a computer program comprising instructions for implementing the method according to the first aspect of the invention, when these instructions are executed by a processor.

A third aspect of the invention relates to a system comprising a plurality of entities, each entity being of at least one type among a first type and a second type, an entity of the second type being associated with a set of rules comprising event data in association with respective actions, an entity of the first type being able to publish at least one event data on a newsfeed of a user.
When an event data is published on the newsfeed by a first entity of the first type, the system may be arranged to detect a correspondence between a rule associated with a second entity of the second type and the published even data, and the second entity of the second type may be arranged to implement the action comprised in the rule corresponding to the published event data.

Other features and advantages of the invention will be apparent from examining the following detailed description, and the appended drawings in which.

Figure 1:
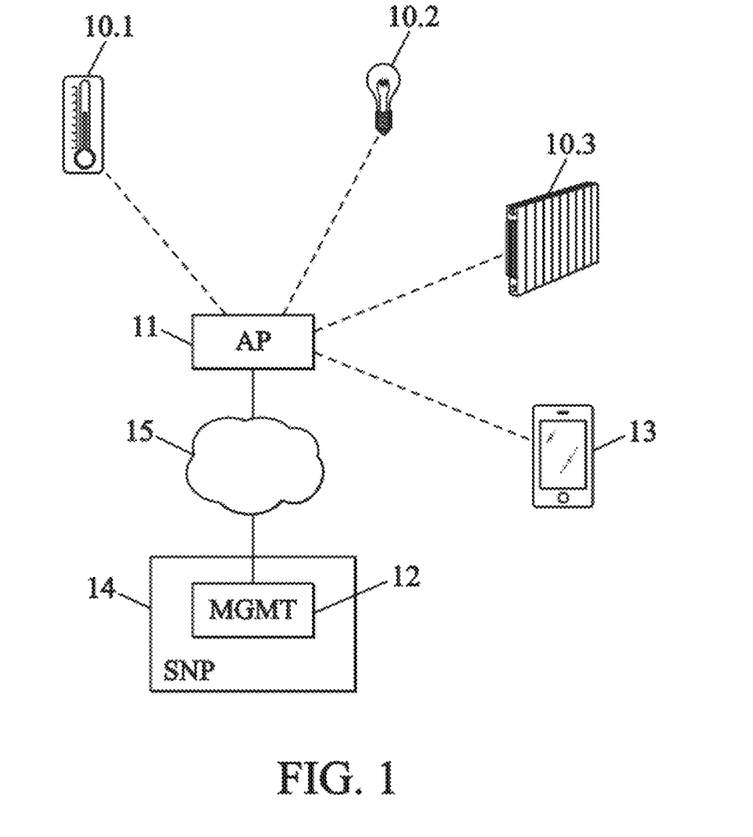
FIG. 1 illustrates a system according to an embodiment of the invention.

FIG. 1 illustrates a system for managing a plurality of entities 10.1 to 10.3 according to an embodiment of the invention. The managed entities are connected objects. As an illustration, the system may comprise a thermometer 10.1 able to measure the temperature in a given room, a light 10.2, and a heater 10.3 able to heat a given room. As detailed in the following, the room where the thermometer 10.1 is located and the room where the heater 10.3 is located may be the same room or may be two separate rooms.

Entities 10.1, 10.2, and 10.3 are connected objects and thus have respective interfaces enabling access to a network via an access point 11, which may be a Wi-Fi terminal for example. A single access point 11 has been represented. However, the invention also covers cases where the objects 10.1 to 10.3 access the network via separate access points.

The access point 11 allows the entities 10.1 to 10.3 to access a network comprising a management unit 12. The management unit 12 may be integrated into a server implementing a service accessible via a network 15, such as the Internet for example. In the following, for illustrative purposes, the management unit 12 is integrated into a social network server 14. Alternatively, the management unit 12 may be integrated into the user's local area network and communicate remotely with the social network server 14 via the Internet 15. Another variant may provide integration of the management unit 12 in a user device 13.

Conventionally, the social network server 14 establishes relationships between user accounts and allows data sharing between users. For example, the account of each user of the social network is associated with its own newsfeed. Users with established relationships ('Friends') can publish messages, photos, or other content on their newsfeed and on the newsfeeds of users who are Friends.

Users can access their newsfeed via a device 13, such as a laptop or desktop computer, a touchscreen tablet, a mobile phone such as a smartphone for example, or any other device capable of accessing the Internet 15 via the access point 11 (for example by a Wi-Fi interface), via a wired interface (Ethernet cable for example), or via a mobile access network (3G/4G for example). For this purpose, an application linked to the social network may be installed on the device 13, thus allowing; access to the social network server 14. The device 13 integrates a user interface (touchscreen for example) capable of displaying the newsfeed of the user on the social network.

Figure 2:
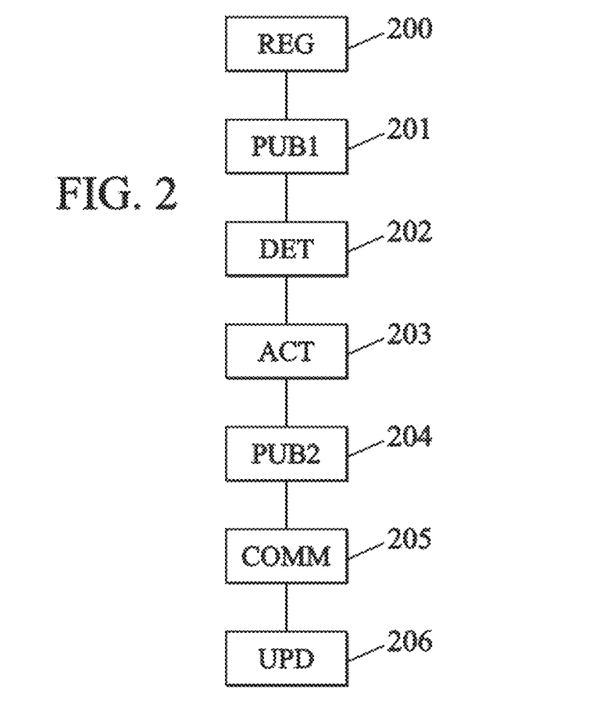
FIG. 2 is a diagram illustrating the steps of a method according to an embodiment of the invention.

FIG. 2 is a diagram illustrating the steps of a method according to an embodiment of the invention.

In step 200, the entities 10.1, 10.2, and 10.3 can be registered with the management unit 12. For example, a new entity joining the network of connected entities can send its own unique identifier to the management unit 12, for the creation of an account specific to each entity. Entities can then establish relationships on the social network by a mechanism of addition to a Friends list of the user who owns entities 10.1 to 10.3 for example.

According to the invention, entities 10.1, 10.2, and 10.3 can be of at least one type among a first type and a second type. The entities of the first type are able to publish at least one event data on the user's newsfeed with which they have established relationships. In the example shown in FIG. 1, the thermometer is of the first type, and can publish temperature measurements on the user's newsfeed.

The entities of the second type are associated with respective sets of rules comprising event data in association with respective actions. For example, the tight 10.2 (located for example in a hallway) may be associated with the following rule:

>if a presence is detected in the hallway, then I turn myself on.

The heater 10.3 may be associated with the following set of rules:

>if the temperature in the room is less than 17° C., I put myself in heating mode;
>if the temperature in the room is between 17° C. and 20° C., I put myself in economy mode;
>if the temperature in the room is greater than 20° C., I turn myself off.

An entity may be both of the first type and the second type. For example, an entity may take measurements and implement an action (a heater including an integrated temperature sensor for example).

According to one embodiment of the invention, the set of rules associated with an entity of the second type is sent to the management unit 12 during the registration step 200, and the management unit 12 may then also store in an internal database an association between the received set of rules and the registered entity of the second type. In a second embodiment of the invention, each entity of the second type locally stores its own set of rules.

In step 201, an event data is published on the newsfeed by a first entity of the first type. For example, the thermometer 10.1 sends a temperature measurement to the management unit 12 which publishes the measured temperature on the user's newsfeed. No restrictions are placed on the manner in which the publishing of an event data is triggered. For example, an entity of the first type may publish event data at a given frequency. Alternatively, the publishing of event data may be caused when data measured by the first entity of the first type exceeds or falls below a threshold. The threshold may be preset or configurable by the user.

The event data may also be published in association with a time stamp. The publishing of time stamped event data facilitates event viewing by the user.

In step 202, a correspondence between a rule associated with a second entity of the second type and the published event data (the temperature measured by the thermometer 10.1) may be detected.

According to the first embodiment described above, in which the management unit 12 has sets of rules for all entities of the second type, step 202 is implemented in the management unit 12. To this effect, the management unit 12 interprets the published event data to determine whether an entity of the second type is concerned by such a publishing. In the example shown, the published data is a temperature measurement, and only the heater 10.3 is therefore concerned (the rule associated with the light 10.2 is only concerned with presence data). One of the three actions described above (activation in heating mode, activation in economy mode, deactivation) is decided from the temperature measurement, and a command is sent in step 203 to the heater 10.3, the command being coupled with the action to take. The heater 10.3 then implements the ordered action. For example, if the published temperature is 19° C., the heater 10.3 activates economy mode.

This first embodiment thus centralizes the intelligence necessary for the interpretation of published event data, in order to automate the implementation of corrective actions. In addition, the user has centralized viewing of the various sets of rules associated with the entities of the second type, and modifying the rules is thus facilitated. The user can, for example, edit the temperature thresholds of the heater 10.3 by connecting to the server of the social network 14.

According to the second embodiment described above, each entity of the second type stores a set of rules locally, and step 202 is then implemented in each entity of the second type. The light 10.2 thus compares the published event data (the measured temperature) with the only rule that it stores. As the rule does not take the temperature into account, no action is taken by the light 10.2. The heater 10.3 also compares the published data (the measured temperature) with the set of rules it stores. As all the stored rules concern the temperature measurement, the action to implement is thus determined in step 20 from the measured temperature. For example, if the measured and published temperature is 19° C., the heater 10.3 activates economy mode.

The second embodiment allows distributing the intelligence among the various entities of the second type. Each entity thus monitors the newsfeed to determine if action is to be taken in response to a published event data. No prior step of declaring rules to the management unit 12 is thus required, and exchanges between entities and the network are thus reduced.

The following description, unless otherwise noted, is equally applicable to the first embodiment and the second embodiment.

To ensure that the heater 10.3 only takes into account the temperature measured in the room where it is located, the stored set of rules (stored either locally or at the management unit 12, depending on the embodiment concerned) may further comprise an identifier of the thermometer located in the same room. The user may define associations between certain connected entities for this purpose, via the user interface of the device 13. In such case, the action is implemented by the heater 10.3 only if the rule corresponding to the event data published by the thermometer 10.2 includes an identifier of the thermometer 10.2. No restrictions are placed on the identifier concerned. It may, for example, be the name under which the thermometer 10.2 was registered with the social network when creating an account.

In optional step 204, each entity of the second type which has implemented an action in response to the published event data can publish a message on the user's newsfeed. To this end, the message is sent to the management unit 12 via the access point 11. The message may indicate the action taken by the entity of the second type. In the example concerned, the heater 10.3 can thus publish a message "Enabling Economy mode" on the user's newsfeed, which advantageously allows the user to monitor actions performed by entities connected to his or her local area network. In addition, each message published on the newsfeed may be accompanied by a time stamp, allowing the user to follow the chronology of events.

In optional step 205, user input is received in response to the publishing of the message. Such input may be a comment such as "like" or "don't like" for example, or "next time, do not lower the heat as much." Alternatively, the input may be a click by the user on a graphical element such as an icon displayed next to the published message ("Like" button for example). The set of rules associated with the entity of the second type having published the message can then be updated, in step 206, based on the user input. For example, if the user has indicated "Don't like" for the message "Enabling Eco mode", the temperature thresholds used in the set of rules of the heater 10.3 can be modified (for example, the thresholds 17° C. and 20° C. are raised to 20°

C. and 23° C., respectively). No restrictions are placed on the mechanisms for updating rules, which may be based on the user's wishes, the environment (square footage of an apartment, number of heaters, room concerned, etc.), and any other factors.

Thus, in the above first embodiment, the management unit 12 detects the user input and updates at least one rule that it stores in association with the entity of the second type for which the message received a comment.

In the second embodiment, the entity of the second type whose message received a comment is advised of the user input, and may, in step 206, update at least one rule that it stores locally.

Figure 3A:
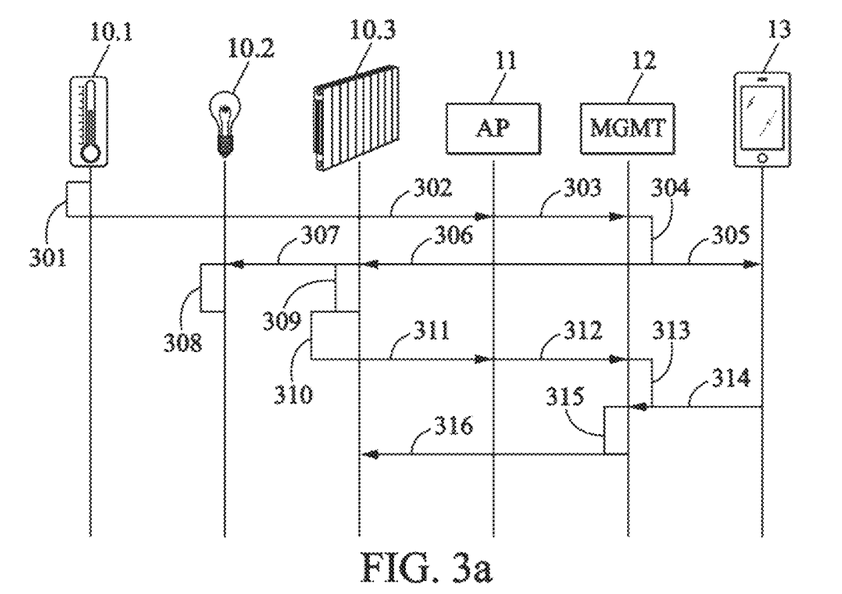
FIGS. 3a and 3b show diagrams of the steps implemented in the system of FIG. 1, according to first and second embodiments.
Figure 3B:
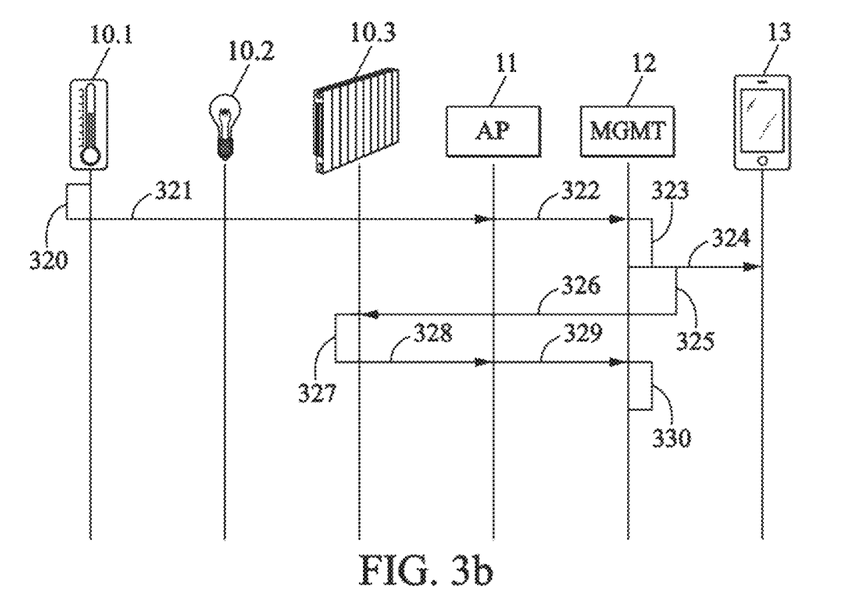

FIGS. 3a and 3b show examples of successive steps implemented in the system of FIG. 1, according to the second and first embodiments of the invention respectively.

FIG. 3a is thus a diagram of steps illustrating the method according to the second embodiment of the invention.

In step 301, the thermometer 10.1 measures the temperature in a given room. In this example, for illustrative purposes we consider the thermometer 10.1 as being in the same room as the heater 10.3. The measured temperature is sent to the access point 12 in step 302, by Wi-Fi for example, and is transferred by the access point 11 to the management unit 12 via the Internet 15 in step 303. In step 304, the management unit 12 publishes the measured temperature on the user's newsfeed, indicating that this publication comes from the account associated with the thermometer 10.1. In step 305, the user may be notified of the publication on his or her newsfeed. In steps 306 and 307, the heater 10.3 and the light 10.2 are notified of the fact that an event data has been published on the user's newsfeed.

In step 308, the light 10.2 compares the published event data with the rule that it stores and determines that no action is to be taken.

In step 309, the heater 10.3 compares the published event data with the rule it stores and determines that an action is to be taken, the action being dependent on the value of the measured temperature. As the measured temperature is 19° C., the action of activating economy mode is implemented by the heater 10.3 in step 310. In optional step 311, a message stating "Economy mode has been activated" is sent to the access point 11, which sends the message to the management unit in step 312. In step 313, the management unit publishes the message on the newsfeed. In step 314, the user comments on the published message, indicating "Don't like." The user comment is published in step 315, and the heater 10.3 is notified of the user input so that it optionally can update the set of rules it stores.

FIG. 3b is a diagram of steps illustrating the method according to the first embodiment of the invention.

In step 320, the thermometer 10.1 measures the temperature in a given room. In this example, for illustrative purposes we consider the thermometer 10.1 as being in the same room as the heater 10.3. The measured temperature is sent in step 321 to the access point 12, by Wi-Fi for example, and transferred by the access point 11 to the management unit 12 via the Internet 15 in step 322. In step 323, the management unit 12 publishes the measured temperature on the newsfeed of the user, indicating that this publication comes from the account associated with the thermometer 10.1. In step 324, the user may be notified of the publishing on the newsfeed. In step 325, the management unit 12 consults the database storing the sets of rules with the entities of the second type in order to detect any correspondence between a rule associated with an entity of the second type and the published event data. In the example, the rules of the heater 10.3 correspond to the detected event (temperature measurement), and so an action can be determined from the set of rules associated with the heater 10.3. A command is sent in step 326 to the heater 10.3, indicating the action to be taken (activation of economy mode in the example concerned). The heater implements the indicated action in step 327, and may optionally send, in step 328, a message to the access point 11 indicating "Enabling economy mode." The message is sent by the access point 11 to the management unit 12 in step 329 and the message is published in step 330. Optional steps related to possible input from the user commenting on the published message have not been represented but may be identical to steps 314-316 illustrated in FIG. 3a.

Figure 4:
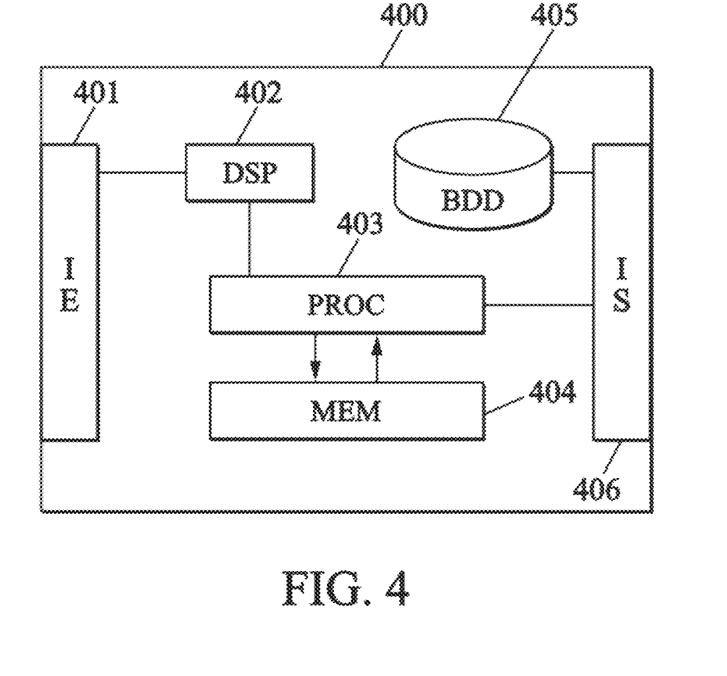
FIG. 4 illustrates a device according to an embodiment of the invention.

FIG. 4 represents a device 400 according to one embodiment of the invention, which can be integrated in the management unit 12.

The device 400 comprises random access memory 404 and a processor 403 for storing instructions to implement steps of the method described above. The device also comprises a database 405 for storing data to be retained after implementing the method. In the first embodiment described above, the database 405 may comprise the sets of rules respectively associated with entities of the second type. The device 400 also comprises an input interface 401 for receiving event data, messages indicating the actions taken by entities of the second type, user input, and entity registration requests, and an output interface 406 for sending commands to the entities of the second type (according to the first embodiment) or notifications indicating new publications or new user input (comments for example) on the newsfeed.

The device 400 may further comprise a digital signal processor (DSP) 402.

The present invention is not limited to the embodiments described above as examples; it extends to other variants.

In addition, the provided examples concern three connected entities and a single access point. Such an architecture is given for illustrative purposes only and does not restrict the invention to these examples alone.

The invention claimed is:

1. A method for managing a plurality of entities, wherein each entity of the plurality of entities is of at least one type among a first type and a second type, an entity of the second type being associated with a set of rules comprising event data in association with respective actions, an entity of the first type comprising a sensor device configured to publish at least one measurement datum on a newsfeed of a user, the method comprising the following operations implemented in a management unit:

receiving a measurement datum to be published from a first entity of the first type, the measurement datum determined by the sensor device of the first entity;

after the receiving, publishing the measurement datum on the newsfeed by the first entity of the first type without requiring user intervention;

detecting a correspondence between a rule associated with a second entity of the second type and the published measurement datum; and transmitting to the second entity of the second type, the action comprised in the rule corresponding to the published measurement datum.

2. The method according to claim 1, comprising, before the publishing, registering with the management unit the first and second entities as entities of the user.

3. The method according to claim 2, further comprising, after registering with the management unit an entity of the second type as an entity of the user, storing in a database a set of rules in association with the registered entity of the second type, wherein the management unit is capable of implementing the detection of the correspondence between the rule associated with the second entity of the second type and the published measurement datum by accessing the database, and sending a command to the second entity of the second type, the command identifying the action contained in the rule corresponding to the published measurement datum.

4. The method according to claim 3, further comprising, after registering an entity of the second type with the management, sending a set of rules of the entity of the second type to the management unit in order to store the set of rules in the database in association with the registered entity of the second type.

5. The method according to claim 3, wherein the sets of rules stored in the database can be modified by a user via a user interface.

6. The method according to claim 1, wherein each entity of the second type stores a set of rules locally, and wherein, upon the publishing of the measurement datum, each entity of the second type compares the published measurement datum with the locally stored set of rules in order to detect a correspondence between a rule and the published measurement datum.

7. The method according to claim 1, further comprising publishing, by the second entity, of a message on the newsfeed, the message indicating the action taken by the second entity.

8. The method according to claim 7, further comprising, upon receiving user input to be associated with the message published by the second entity updating the rule corresponding to the published measurement datum, based on the user input.

9. The method according to claim 1, wherein at least one rule further comprises an identifier of an entity of the first type, and wherein the second entity of the second type implements the action contained in the rule corresponding to the published measurement datum only if the identifier of the entity of the first type comprised in the rule corresponds to the first entity that published the measurement datum.

10. A non-transitory computer readable program product, with a program stored thereon, the program comprising instructions for implementing the method according to claim 1, when these instructions are executed by a processor.

11. A management unit included in a system comprising a plurality of entities, wherein each entity of the plurality of entities being of at least one type among a first type and a second type, an entity of the second type being associated with a set of rules comprising event data in association with respective actions, an entity of the first type comprising a sensor device configured to publish at least one measurement datum on a newsfeed of a user without requiring user intervention;

wherein the management unit is configured to:
receive a measurement datum to be published from a first entity of the first type, the measurement datum determined by the sensor device of the first entity;
upon the publishing of the measurement datum on the newsfeed by the first entity of the first type, the management unit is arranged to detect a correspondence between a rule associated with a second entity of the second type and the published measurement datum; and
transmit to the second entity of the second type is arranged to implement the action comprised in the rule corresponding to the published measurement datum.

* * * * *